United States Patent
Ishida et al.

(10) Patent No.: US 9,264,601 B2
(45) Date of Patent: Feb. 16, 2016

(54) SIGNAL PROCESSING APPARATUS, IMAGE PICKUP APPARATUS, AND IMAGE PICKUP SYSTEM

(71) Applicant: CANON KABUSHIKI KAISHA, Tokyo (JP)

(72) Inventors: Chisato Ishida, Tokyo (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/149,082

(22) Filed: Jan. 7, 2014

(65) Prior Publication Data

US 2014/0204251 A1 Jul. 24, 2014

(30) Foreign Application Priority Data

Jan. 18, 2013 (JP) ................. 2013-007281

(51) Int. Cl.
*H04N 5/232* (2006.01)
*H04N 5/235* (2006.01)
*H04N 5/351* (2011.01)
*H04N 5/355* (2011.01)
*H04N 5/369* (2011.01)

(52) U.S. Cl.
CPC ......... *H04N 5/23212* (2013.01); *H04N 5/2351* (2013.01); *H04N 5/351* (2013.01); *H04N 5/3559* (2013.01); *H04N 5/3696* (2013.01)

(58) Field of Classification Search
CPC . H04N 5/23212; H04N 5/2351; H04N 5/351; H04N 5/3559; H04N 5/3696
See application file for complete search history.

(56) References Cited

U.S. PATENT DOCUMENTS

| | | | |
|---|---|---|---|
| 2008/0180554 A1* | 7/2008 | Kobayashi et al. | 348/246 |
| 2013/0235276 A1* | 9/2013 | Ogawa | 348/703 |
| 2013/0335547 A1 | 12/2013 | Ogawa | |
| 2014/0146197 A1* | 5/2014 | Okuzawa et al. | 348/222.1 |

FOREIGN PATENT DOCUMENTS

| | | |
|---|---|---|
| EP | 1085751 B1 | 11/2012 |
| JP | 2001-83407 A | 3/2001 |

OTHER PUBLICATIONS

U.S. Appl. No. 14/200,151, filed Mar. 7, 2014.

* cited by examiner

*Primary Examiner* — Christopher K Peterson
(74) *Attorney, Agent, or Firm* — Fitzpatrick, Cella, Harper & Scinto

(57) ABSTRACT

A signal processing apparatus which processes signals obtained from an image pickup element including a plurality of first pixels sharing a first microlens and a plurality of second pixels sharing a second microlens, the first pixels and the second pixels having saturation characteristics different from each other, and the signal processing apparatus includes a saturation detector configured to detect a saturated pixel whose charge amount has reached a saturation level among the first pixels and the second pixels, and an estimating portion configured to estimate the charge amount of the saturated pixel using a nearby pixel of the saturated pixel.

18 Claims, 7 Drawing Sheets

SIGNAL PROCESSING APPARATUS, IMAGE PICKUP APPARATUS, AND IMAGE PICKUP SYSTEM

BACKGROUND OF THE INVENTION

1. Field of the Invention

The present invention relates to a signal processing apparatus which processes a signal obtained from an image pickup element including a plurality of pixels that share one microlens.

2. Description of the Related Art

Previously, an image pickup apparatus which performs focus detection based on a phase difference between two pupil-divided images obtained from an image pickup element including a plurality of pixels that share one microlens has been known. Japanese Patent Laid-open No. 2001-83407 discloses an image pickup apparatus having an image pickup element including a plurality of pixels that share one microlens. The image pickup apparatus disclosed in Japanese Patent Laid-open No. 2001-83407, with performing focus detection based on a phase difference between two pupil-divided images obtained from the image pickup element, generates an image signal using an added signal (added electric charge) from the plurality of pixels that share one microlens, thereby obtaining an image output of high quality.

However, the image pickup apparatus disclosed in Japanese Patent Laid-open No. 2001-83407 cannot perform highly accurate focus detection when each of the divided pixels is saturated.

BRIEF SUMMARY OF THE INVENTION

The present invention provides a signal processing apparatus, an image pickup apparatus, and an image pickup system which improves accuracy of focus detection.

A signal processing apparatus as one aspect of the present invention processes signals obtained from an image pickup element including a plurality of first pixels sharing a first microlens and a plurality of second pixels sharing a second microlens, the first pixels and the second pixels having saturation characteristics different from each other, and the signal processing apparatus includes a saturation detector configured to detect a saturated pixel whose charge amount has reached a saturation level among the first pixels and the second pixels, and an estimating portion configured to estimate the charge amount of the saturated pixel using a nearby pixel of the saturated pixel.

An image pickup apparatus as another aspect of the present invention includes an image pickup element including a plurality of first pixels sharing a first microlens and a plurality of second pixels sharing a second microlens, the first pixels and the second pixels having saturation characteristics different from each other, a saturation detector configured to detect a saturated pixel whose charge amount has reached a saturation level among the first pixels and the second pixels, and an estimating portion configured to estimate the charge amount of the saturated pixel using a nearby pixel of the saturated pixel.

An image pickup system as another aspect of the present invention includes an image pickup optical system and the image pickup apparatus.

Further features and aspects of the present invention will become apparent from the following description of exemplary embodiments with reference to the attached drawings.

DESCRIPTION OF THE EMBODIMENTS

Figure 1:
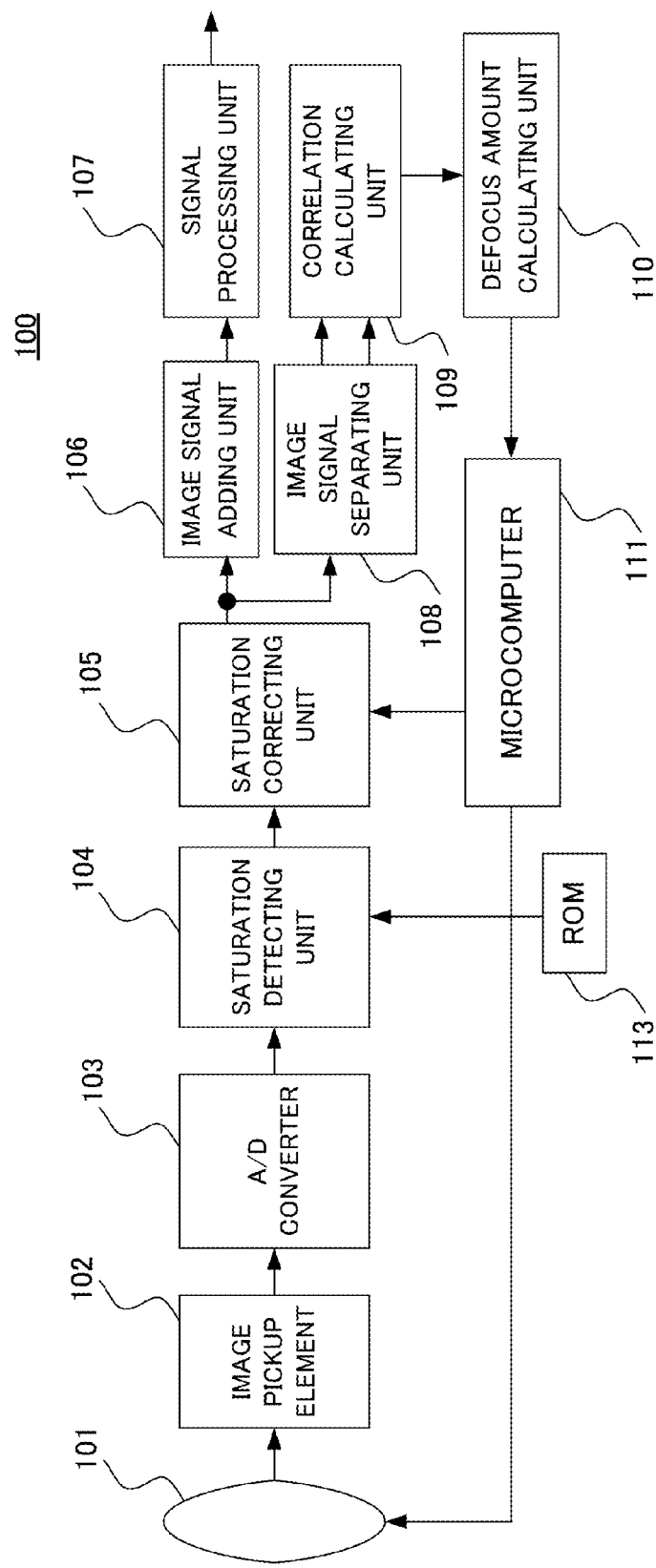
FIG. 1 is a block diagram illustrating a configuration of an image pickup apparatus in the present embodiment.

Exemplary embodiments of the present invention will be described below with reference to the accompanied drawings. In each of the drawings, the same elements will be denoted by the same reference numerals and the duplicate descriptions thereof will be omitted.

First of all, referring to FIG. 1, a configuration of an image pickup apparatus 100 in the present embodiment will be described. FIG. 1 is a block diagram illustrating the configuration of the image pickup apparatus 100. Reference numeral 101 denotes a lens unit (an image pickup optical system), reference numeral 102 denotes an image pickup element, and reference numeral 103 denotes an A/D converter. The image pickup element 102 includes a plurality of first pixels sharing a first microlens and a plurality of second pixels sharing a second microlens. Further, the image pickup element 102 is configured such that the plurality of first pixels and the plurality of second pixels have saturation characteristics different from each other.

Reference numeral 104 denotes a saturation detecting unit (a saturation detector). The saturation detecting unit 104 detects a saturated pixel whose charge amount has reached a saturation level among the plurality of first pixels and the plurality of second pixels in the image pickup element 102. Reference numeral 105 denotes a saturation correcting unit. The saturation correcting unit 105 performs a correction process on the saturated pixel based on a signal (a signal indicating the saturated pixel) outputted from the saturation detecting unit 104. That is, the saturation correcting unit 105 is an estimating portion that estimates a charge amount of the saturated pixel using a nearby pixel of the saturated pixel (a pixel adjacent to the saturated pixel). As in each embodiment described below, the saturation correcting unit 105 estimates the charge amount of the saturated pixel using the charge amounts of the nearby pixel located around the saturated pixel. Alternatively, the saturation correcting unit 105 estimates the charge amount of the saturated pixel using an added pixel value whose linearity is kept of the nearby pixels located around the saturated pixel. In the present embodiment, the saturation detecting unit 104 and the saturation correcting unit 105 constitute a signal processing apparatus which processes a signal obtained from the image pickup element 102.

Reference numeral 106 denotes an image signal adding unit that adds signals obtained from a plurality of pixels sharing one microlens. 107 denotes a signal processing unit that performs various kinds of signal processes such as a process of converting into a color video signal on the added signal outputted from the image signal adding unit 106. The signal processing unit 107 outputs image data obtained by performing various kinds of signal processes as a shot image.

Reference numeral 108 denotes an image signal separating unit that separates an A image and a B image. The image signal separating unit 108 inputs the same signal as that of the signal inputted from the saturation correcting unit 105 to the image signal adding unit 106, which outputs two different image signals. Reference numeral 109 denotes a correlation calculating unit (a processor). The correlation calculating unit 109 performs a correlation calculation based on signals (image signals) obtained from at least a part of the plurality of pixels of the image pickup element 102. Reference numeral 110 denotes a defocus amount calculating unit. Reference numeral 111 denotes a microcomputer (a controller) that controls an entire system of the image pickup apparatus 100.

Reference numeral 113 denotes a ROM (a storage unit) that stores individual differences of saturation levels. Previously, there has been a circuit for erasing a non-linear part of a color and a false color which are generated at the time of saturation, as a circuit that detects the saturation level of the image pickup element 102. However, since its purpose is to make chroma gently change in the vicinity of saturation to become pure white at the saturation level, the saturation level did not need to be precisely adjusted. In the present embodiment, in order to correct a charge leakage due to saturation with high accuracy, the individual differences of the saturation levels are previously stored in the ROM 113 of the system.

The image pickup apparatus 100 of the present embodiment is configured to integrally include the lens unit 101 (an image pickup optical system), but the present invention is not limited to this. The present embodiment can also be applied to an image pickup system that includes an image pickup apparatus body and an image pickup optical system (a lens apparatus) which is removably mounted on the image pickup apparatus body.

Figure 2A:
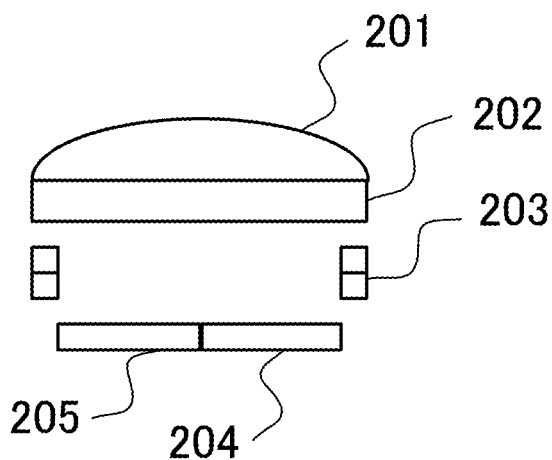
FIGS. 2A and 2B are configuration diagrams of an image pickup element in the present embodiment.
Figure 2B:
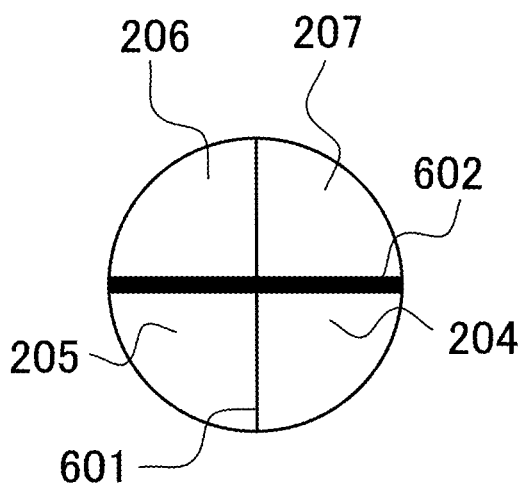

Next, referring to FIGS. 2A and 2B, a configuration of the image pickup element in the present embodiment will be described. FIGS. 2A and 2B are configuration diagrams of the image pickup element 102 in the present embodiment, and FIG. 2A is a cross-sectional view of a main part of the image pickup element 102 and FIG. 2B is a plan view of pixels 204 to 207 (a light receiving portion).

In FIG. 2A, a microlens 201 efficiently collects light (incident light) on the pixels 204 to 207 (a plurality of photoelectric conversion portions) as light receiving portions. A color filter 202 transmits selectively only light having a desired wavelength band out of the incident light. Reference numeral 203 denotes a wiring layer of a semiconductor (the image pickup element 102). Light passing through the color filter 202 is received by the pixels 204 to 207 (photodiodes) so that photoelectric conversion is performed.

Although the image pickup element 102 usually has one light receiving portion (a photodiode) for one microlens 201, in the present embodiment, a light receiving portion (a pixel) for one microlens 201 is divided into multiple sections so as to obtain pupil-divided images. For example, where there is provided a total-of-four-divided light receiver (four divided pixels) produced by horizontally dividing it in two and further vertically dividing it in two as a multi-divided light receiving portion, by adding the two upper pixels and adding the two lower pixels, images equivalent to pupil-divided images that are obtained when vertically divided in two can be obtained. On the other hand, by adding the two left pixels of the four divided pixels and adding the two right pixels, images equivalent to pupil-divided images that are obtained when vertically divided in two can be obtained. Thus, as compared with two divided pixels divided horizontally or vertically, both vertical and horizontal pupil-divided images can be obtained on a unit of one microlens 201 basis at the same time.

As illustrated in FIG. 2B, the image pickup element 102 has the four divided pixels 204 to 207 for one microlens 201. In the present embodiment, the pixels 204 to 207 include a plurality of pixels (first, second, and third pixels) sharing one microlens 201. For convenience of description, hereinafter, the pixels 207, 206, and 204 are referred to as first, second, and third pixels respectively, but the present invention is not limited to this.

In the four-divided light receiving portions (the pixels 204 to 207), a boundary 601 having a structure which actively makes electric charge leak into an adjacent pixel when the charge amount of each pixel is saturated and a boundary 602 having a structure which does not actively make electric charge leak are formed. The boundary 601 (a first or third boundary) is provided between the pixel 207 (a first or fourth pixel) and the pixel 206 (a second or fifth pixel) (and is provided between the pixel 205 and the pixel 204). The boundary 602 (a second or fourth boundary) is provided between the pixel 207 (a first or fourth pixel) and the pixel 204 (a third or sixth pixel) (and is provided between the pixel 206 and the pixel 205).

The boundary 601 is configured such that a charge is movable from the first pixel to the second pixel (for example, the pixel 206), i.e. such that the charge easily leaks, when the charge amount of the first pixel (for example, the pixel 207) is saturated. On the other hand, the boundary 602 is configured such that the charge is prevented from moving from the first pixel to the third pixel (for example, the pixel 204), i.e. such that the charge hardly leaks, when the charge amount of the first pixel (for example, the pixel 207) is saturated. That is, when the charge amount of the pixel 207 is saturated (when the charge amount has reached saturation), the amount of charge which moves from the pixel 207 to the pixel 206 via the boundary 601 (a first or third charge amount) is greater than the amount of charge which moves from the pixel 207 to the pixel 204 via the boundary 602 (a second or fourth charge amount).

Subsequently, referring to FIG. 3, the saturation of the charge amount of pixel will be described. When light incident on the microlens evenly illuminates on divided pixels, linearity is kept by adding the divided pixels. However, as for pixels located at high positions in an image height, the light does not illuminate on divided pixels evenly.

Figure 3:
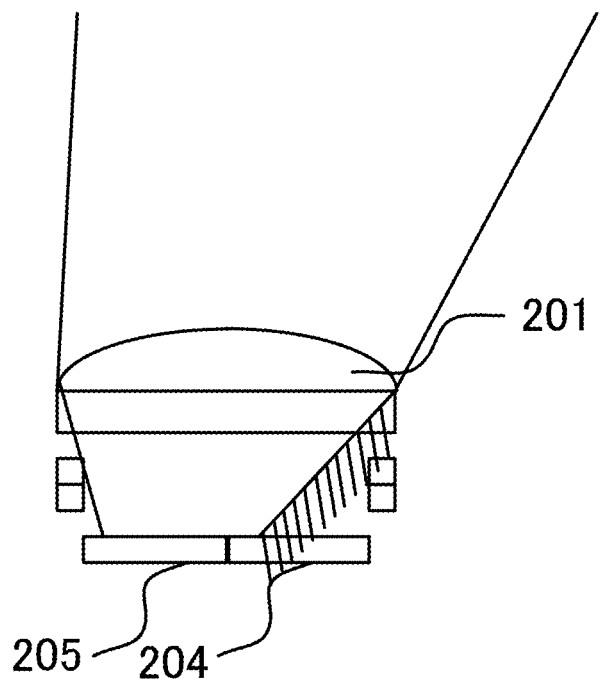
FIG. 3 is a diagram of describing a case where a pixel located at a high position in an image height receive light in the image pickup element of the present embodiment.

FIG. 3 illustrates a situation in which light is irradiated onto the pixels 204 and 205 (the light receiving portions) through the microlens 201 at a high position in the image height. In FIG. 3, the center of the optical axis is located to the far right of the pixels 204 and 205. Because light is usually more obliquely incident at a peripheral region further from the center of an image, the pixel 205 receives more light, but the pixel 204 hardly receives light. Hence, the pixel 205 (the charge amount of the pixel 205) reaches a saturated state earlier than the pixel 204 (the charge amount of the pixel 204). Thus, the linearity of the added value is broken.

In order to avoid this phenomenon, in the present embodiment, the boundaries 601 and 602 as illustrated in FIG. 2 are provided. For example, the boundaries are configured such that an electric charge generated in the pixel 205 having reached the saturation state leaks into the pixel 204, and thus the linearity of the added pixel value obtained by adding the values of the pixels 205 and 204 is kept.

Figure 9A:
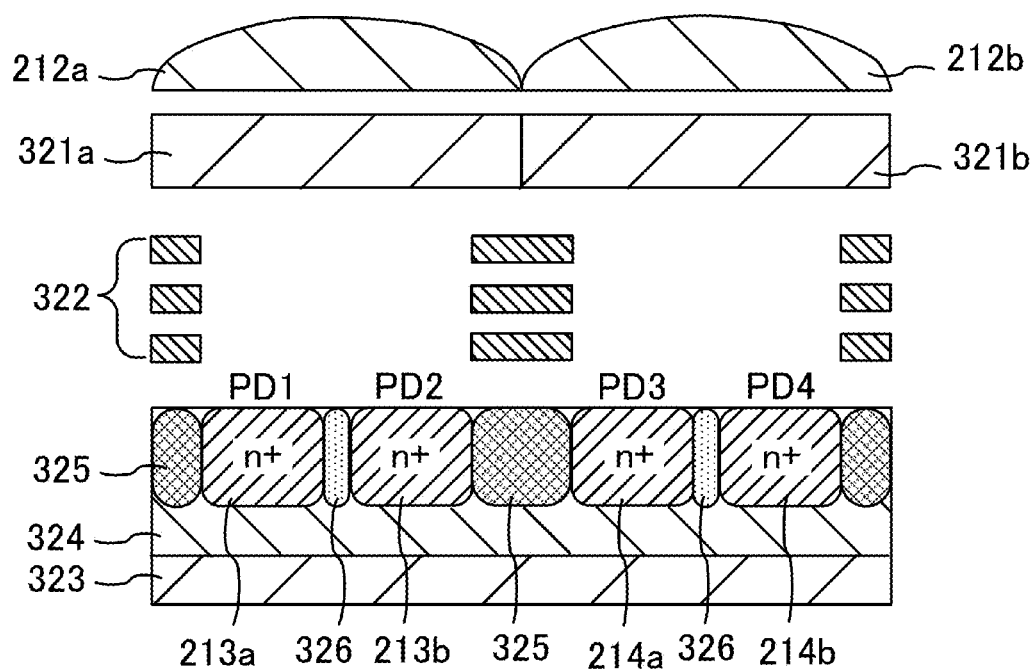
FIGS. 9A and 9B are a cross-sectional view and a schematic view of a potential of a main part of the image pickup element of the present embodiment.
Figure 9B:
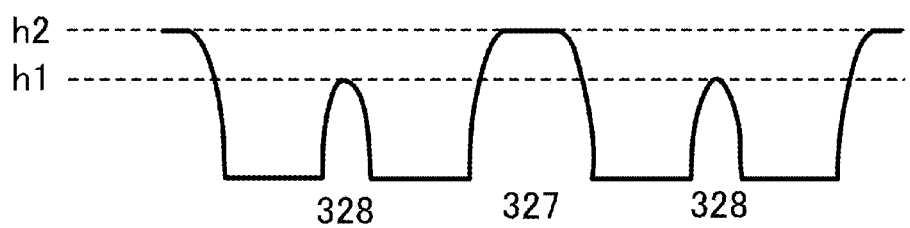

Next, referring to FIGS. 9A and 9B, one example of structures of the boundaries 601 and 602 will be described. FIG. 9A illustrates a cross-sectional structure of the main part of the image pickup element 102 of the present embodiment, and FIG. 9B is a diagram schematically illustrating a potential for the signal electric charges of the semiconductor regions in FIG. 9A. Although FIG. 9B illustrates four pixels (photoelectric conversion elements) corresponding to two adjacent microlenses 212a and 212b, description relating to the boundaries 601 and 602 can also be applied to a configuration in which four pixels share one microlens.

In FIG. 9A, reference numerals 321a and 321b denote color filters. Reference numeral 322 denotes a wiring layer. Three wiring layers placed at different heights are illustrated in the drawing. A P-type semiconductor region 324 and a plurality of N-type semiconductor regions 213 and 214 form PN junctions. The P-type semiconductor region 324 is placed on a semiconductor region 323. For example, the semiconductor region 323 is constituted by using a P-type semiconductor substrate or an N-type semiconductor substrate.

The pixels (the photoelectric conversion elements) are configured to include the N-type semiconductor regions 213 and 214 and the P-type semiconductor region 324. Specifically, the P-type semiconductor region 324 and N-type semiconductor regions 213a and 213b constitute two pixels (photoelectric conversion elements PD1 and PD2). Further, the P-type semiconductor region 324 and N-type semiconductor regions 214a and 214b constitute two pixels (photoelectric conversion elements PD3 and PD4). The N-type semiconductor regions 213a, 213b, 214a, and 214b are low in potential for electrons and are regions collecting signal electric charges. A P-type semiconductor region may be placed on the incidence surface side of the N-type semiconductor regions 213a, 213b, 214a, and 214b to form a so-called buried photodiode. Light collected by one microlens 212a is incident on the photoelectric conversion elements PD1 and PD2. Light collected by one microlens 212b is incident on the photoelectric conversion elements PD3 and PD4.

AP-type semiconductor region 326 is formed between the N-type semiconductor regions 213a and 213b included respectively in the photoelectric conversion elements PD1 and PD2. The P-type semiconductor region 326 functions as a potential barrier for electrons between the N-type semiconductor regions 213a and 213b. The P-type semiconductor region 326 corresponds to the boundary 601 in FIG. 2B.

Although the photoelectric conversion elements PD2 and PD3 are placed adjacent to each other, the lights collected by the separate microlenses 212a and 212b are incident respectively on the photoelectric conversion elements PD2 and PD3. A P-type semiconductor region 325 is formed between the N-type semiconductor regions 213b and 214a included respectively in the photoelectric conversion elements PD2 and PD3. The P-type semiconductor region 325 functions as a potential barrier for electrons between the N-type semiconductor regions 213b and 214a. The P-type semiconductor region 325 corresponds to the boundary 602 in FIG. 2B.

In the present embodiment, the impurity concentrations of the P-type semiconductor regions 325 and 326 are different from each other. Specifically, the P-type impurity concentration of the P-type semiconductor region 326 is lower than that of the P-type semiconductor region 325. This concentration relation can make the height of the potential barrier between the photoelectric conversion elements PD1 and PD2 be lower than the height of the potential barrier between the photoelectric conversion elements PD2 and PD3.

As illustrated in FIG. 9B, the height of the potential barrier 327 between the photoelectric conversion elements PD1 and PD2 is indicated by h1. The height of the potential barrier 328 between the photoelectric conversion elements PD2 and PD3 is indicated by h2. The height h1 of the potential barrier between the photoelectric conversion elements PD1 and PD2 is lower than the height h2 of the potential barrier between the photoelectric conversion elements PD2 and PD3.

In the present embodiment, it is preferred that the P-type impurity concentration of the P-type semiconductor region 325 constituting the potential barrier 327 is set to be three times or more that of the P-type semiconductor region 326 constituting the potential barrier 328. This configuration can form a potential barrier difference of the same order as the potential (about 26 mV at room temperature 27° C.) that a charge has. More preferably, the impurity concentration is set to be ten times or more, considering the operating temperature range of the image pickup apparatus (the image pickup element 102).

In the present embodiment, the impurity concentration of the boundary 601 is set lower than that of the boundary 602, but is not limited to this, and the same effect can be achieved, for example, by making the width of the boundary 601 be smaller than that of the boundary 602.

Embodiment 1

Next, referring to FIGS. 4A, 4B, and 5, a method of correction by the saturation correcting unit 105 in Embodiment 1 of the present invention will be described. The present embodiment describes a method of correction when the number of divided pixels is four (the four-divided pixel configuration).

Figure 4A:
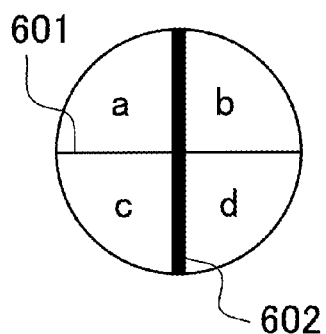
FIGS. 4A to 4F are diagrams illustrating variations of the pixels in the image pickup element of the present embodiment.
Figure 4C:
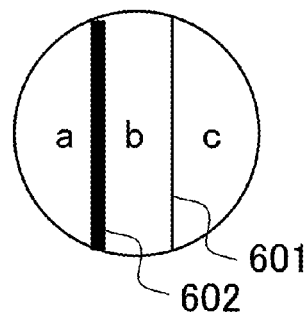
Figure 4E:
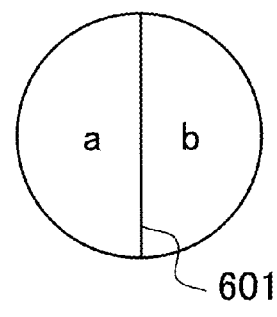
Figure 4B:
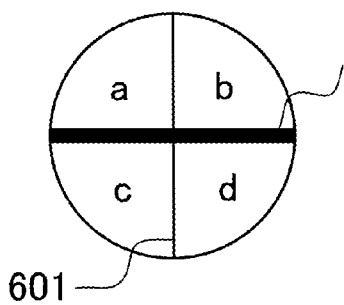
Figure 5:
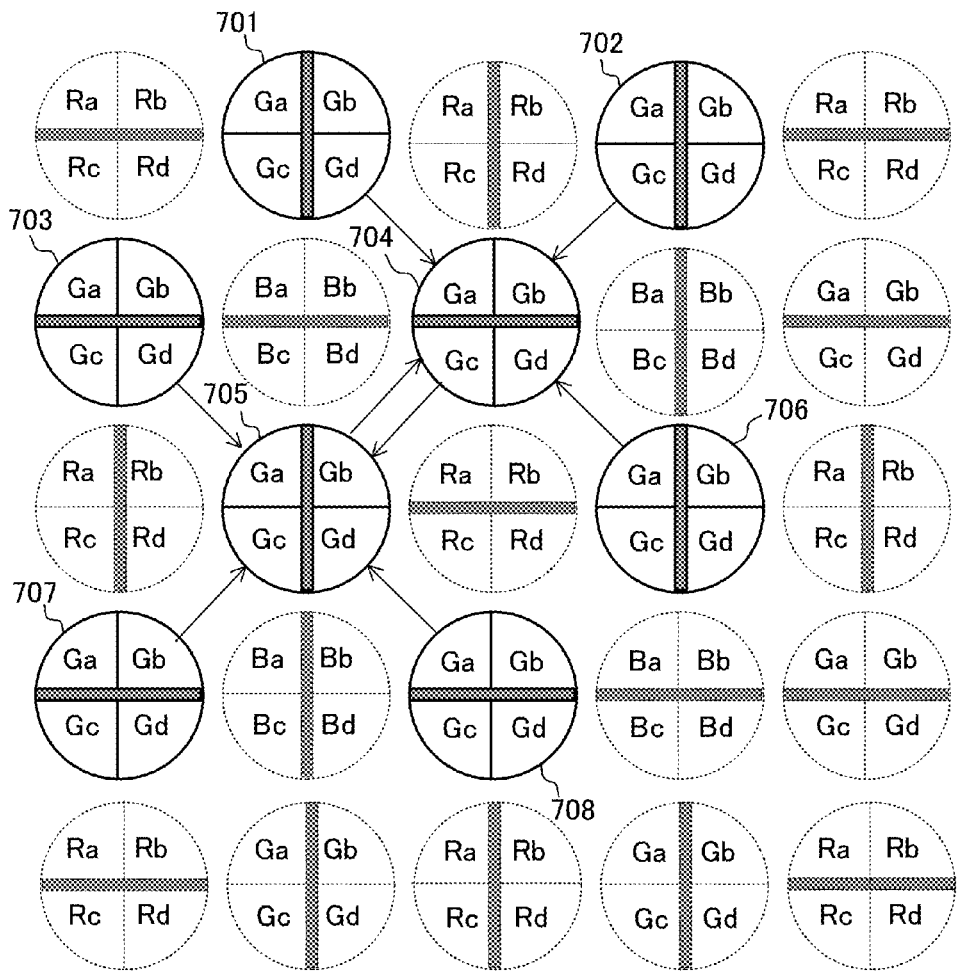
FIG. 5 is a diagram illustrating a pixel arrangement of the image pickup element in Embodiment 1.

FIGS. 4A and 4B are diagrams illustrating variations of the pixels of the image pickup element 102 in the present embodiment. FIG. 5 is a diagram illustrating the pixel arrangement of the image pickup element 102. In the present embodiment, the pixels of the image pickup element 102 are configured in a Bayer array. Each of pixels of R, G, B is a pixel vertically and horizontally divided evenly in four for one microlens 201 as illustrated in FIGS. 4A and 4B.

In FIGS. 4A and 4B, the boundary 602 dividing a pixel is a boundary through which a charge does not leak (a boundary through which the charge hardly leaks), and the boundary 601 is a boundary through which the charge leaks (a boundary through which the charge easily leaks). Therefore, the charge of the pixel illustrated in FIG. 4A leaks in a vertical direction (between pixels a, c or pixels b, d). In FIG. 4A, for example, the pixels b, d, and a are first, second, and third pixels respectively. Meanwhile, the charge of the pixel illustrated in FIG. 4B leaks in a lateral direction (between pixels a, b or pixels c, d). In FIG. 4B, for example, the pixels b, a, and d are fourth, fifth, and sixth pixels respectively. In the present embodiment, as illustrated in FIG. 5, pixels having these characteristics (the vertically leaking pixel of FIG. 4A and the laterally leaking pixel of FIG. 4B) are placed such that as for adjacent pixels having the same color, the vertically leaking pixels alternate with the laterally leaking pixels.

In the four pupil-divided pixels, for example, generating a phase difference signal based on the pixel signal obtained by adding the pixels a, c in FIG. 4A and the pixel signal obtained by adding the pixels b, d, accurate focus detection can be performed even when the object is a pattern having vertical stripes. Further, generating a phase difference signal based on the pixel signal obtained by adding the pixels a, b in FIG. 4B and the pixel signal obtained by adding the pixels c, d, accurate focus detection can be performed even when the object is a pattern having horizontal stripes.

In order to detect a defocus amount with higher accuracy, it is effective to set the base line length of the focus detection pixel to be longer. Hence, for example, generating a phase difference signal using pixels on a diagonal line such as the pixels a, d or pixels b, c in FIGS. 4A and 4B, the focus detection accuracy can be improved.

<Case of Performing the Correcting Using the Values of Non-Destructive Pixels Arranged in the Vicinity When One of the Four Divided Pixels is Saturated>

Subsequently, referring to FIG. 5, a method of correcting a pixel 704 (a G pixel) in the case where the upper right pixel of four pupil-divided pixels is saturated will be described. When a pixel 704Gb is saturated, the charge of the pixel 704Gb leaks to a pixel 704Ga since the pixel 704 has the structure in which a charge leaks in a lateral direction. Hence, the charge amount of the pixel 704Ga becomes an amount obtained by adding the original charge amount of pixel 704Ga to the amount of charge leaked from the pixel 704Gb. On the other hand, for pixels 704Gc and 704Gd, the original value (an original charge amount) is kept since the pixel 704 has the structure in which the charge does not leak in a vertical direction, so that they are non-destructive (the original charge amount is not lost). Accordingly, the pixel 704Ga and the pixel 704Gb are subject to correction.

Figure 6:
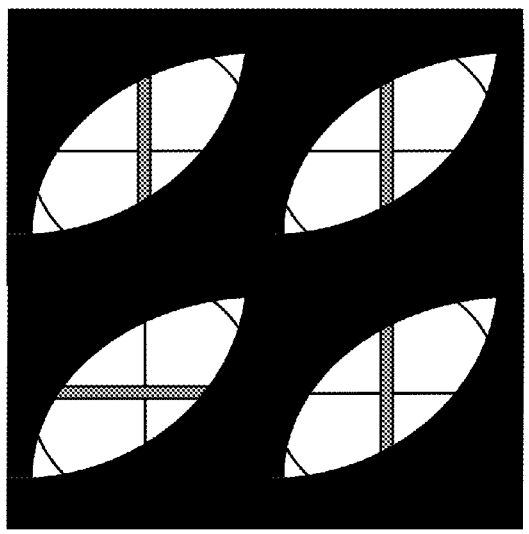
FIG. 6 is a diagram illustrating a situation where vignetting occurs in each pixel at the periphery of the screen in Embodiment 1.

Here, referring to FIG. 6, a vignetting will be described. The vignetting is a phenomenon that a light beam is restricted by an edge on an object side or a body side of a lens when a aperture stop is set to around an open state, which is also referred to as an aperture eclipse. At the center of the optical axis, there is no influence because the edge of the lens is larger in diameter than the aperture, but when the image height is high, an influence may occur. FIG. 6 illustrates a situation where the vignetting, which occurs in the periphery on the screen, occurs in each pixel. The incident angle and the vignetting for a pixel gently change as the image height from the center of the optical axis becomes higher. Hence, the nearby pixels demonstrate almost the same characteristic.

When the pixel 701Gb is saturated, the charge of the pixel 701Gb leaks to the pixel 701Gd since the pixel 701 has the structure in which the charge leaks in the vertical direction. Hence, the charge amount of the pixel 701Gd becomes a value obtained by adding the original charge amount of the pixel 701Gd to the amount of charge leaked from the pixel 701Gb. On the other hand, for pixels 701Ga and 701Gc, the original value (an original charge amount) is kept since the pixel 701 has the structure in which a charge does not leak in a lateral direction, so that they are non-destructive. Similarly, the pixels Ga and Gc of pixels 702, 705, and 706 are also non-destructive.

In the present embodiment, since pixels having correct values (correct charge amounts) exist in the vicinity of the pixel to be corrected, the saturation correcting unit 105 can estimate the original charge amounts (correct values) of the pixels to be corrected by performing a defect pixel correction. Specifically, as represented by the following Expression (1), the original value of the pixel 704Ga can be derived from an average value of non-destructive pixels having the same color in its vicinity (located nearby).

(Pixel 701*Ga*+Pixel 702*Ga*+Pixel 705*Ga*+Pixel 706*Ga*)/4=Original Pixel 704*Ga*  (1)

The value of the pixel 704Ga indicates a value obtained by adding its original value to the amount of charge leaked from the pixel 704Gb. Hence, as represented by the following Expression (2), the original value of the pixel 704Gb can be derived by adding the difference between the value (an actual value) of the pixel 704Ga and the original value of the pixel 704Ga to the value of pixel 704Gb.

Pixel 704*Gb*+(Pixel 704*Ga*−Original Pixel 704*Ga*)=Original Pixel 704*Gb*  (2)

<Case of Performing the Correction Using Added Pixel Values not Demonstrating Knee Characteristics in the Vicinity when Two of the Four Divided Pixels are Saturated>

Subsequently, referring to FIG. 5, a method of correcting the pixel 704 (a G pixel) in the case where the two upper pixels of four pupil-divided pixels are saturated will be described. When the pixels 704Ga and 704Gb are saturated, for the pixels 704Gc and 704Gd, the original value is kept since the pixel 704 has the structure in which a charge does not leak in the vertical direction, so that they are non-destructive. Accordingly, the pixel 704Ga and the pixel 704Gb are subject to the correction.

When the pixels 701Ga and 701Gb are saturated, the charge of the pixel 701Ga leaks to the pixel 701Gc since the pixel 701 has the structure in which the charge leaks in the vertical direction. Hence, the value of the pixel 701Gc becomes a value obtained by adding the original value of the pixel 701Gc to the amount of charge leaked from pixel 701Ga. Similarly, because the charge of the pixel 701Gb leaks to the pixel 701Gd, the value of pixel 701Gd becomes a value obtained by adding the original value of pixel 701Gd to the amount of charge leaked from the pixel 701Gb. For both the added pixel value of the pixels Ga and Gc of and the added pixel value of pixels Gb and Gd of the pixels having the same color in the vicinity (located nearby), their linearity is kept because they, as added pixels, are not saturated. Thus, these values are reliable.

In the present embodiment, because the pixels having correct values (correct charge amounts) exist in the vicinity of the pixel to be corrected, the saturation correcting unit 105 can estimate the original charge amount (a correct value) of the pixel to be corrected by performing the defect pixel correction. That is, it is presumed that the added pixel value of pixels Gb and Gd of a pixel (the pixel 701) having the same color in the vicinity and the added pixel value of the pixels 704Gb and 704Gd are the same (substantially the same). This also applies to the respective added pixels of pixels Ga, Gc and pixels Gb, Gd of the pixels 702, 705, and 706.

Thus, as represented by the following Expression (3), the original value of the pixel 704Ga can be derived by subtracting the pixel value of the non-destructive pixel 704Gc from the average value of the added pixel values of pixels Ga and Gc of the pixels having the same color in the vicinity.

((Pixel 701*Ga*+Pixel 701*Gc*)+(Pixel 702*Ga*+Pixel 702*Gc*)+(Pixel 705*Ga*+Pixel 705*Gc*)+(Pixel 706*Ga*+Pixel 706*Gc*))/4−Pixel 704*Gc*=Original Pixel 704Ga  (3)

In addition, the original value of the pixel 704Gb can be derived by the same procedure.

<Case of Performing the Correction Using the Values of Non-Destructive Pixels in the Vicinity When Two of the Four Divided Pixels are Saturated>

Subsequently, referring to FIG. 5, a method of correcting the pixel 705 (a G pixel) in the case where the two upper pixels of the four pupil-divided pixels are saturated will be described. When the pixels 705Ga and 705Gb are saturated, the charge of the pixel 705Ga leaks to the pixel 705Gc since the pixel 705 has the structure in which the charge leaks in the vertical direction. Hence, the value (a charge amount) of the pixel 705Gc becomes a value obtained by adding the value (original charge amount) of pixel 705Gc to the amount of charge leaked from the pixel 705Ga. Similarly, since the charge of the pixel 705Gb leaks to the pixel 705Gd, the value of the pixel 705Gd becomes a value obtained by adding the original value of pixel 705Gd to the amount of charge leaked from the pixel 705Gb. Accordingly, the pixels 705Ga, 705Gb, 705Gc, and 705Gd are subject to the correction.

When the pixels 703Ga and 703Gb are saturated, for the pixels 703Gc and 703Gd, the original value is kept since the pixel 703 has the structure in which the charge does not leak in the vertical direction, so that they are non-destructive. Similarly, the pixels Gc, Gd of the pixels 704, 707, and 708 are also non-destructive.

In the present embodiment, because the pixel having a correct value (a correct charge amount) exists in the vicinity of the pixel to be corrected, the saturation correcting unit 105 can estimate the original charge amount (right values) of the pixel to be corrected by performing the defect pixel correction. Specifically, as represented by the following Expression (4), the original value of the pixel 705Gc is derived from the average value of the pixels Gc of peripheral pixels (nearby pixels).

(Pixel 703*Gc*+Pixel 704*Gc*+Pixel 707*Gc*+Pixel 708*Gc*)/4=Original Pixel 705*Gc*     (4)

The value (an actual value) of the pixel 705Gc is a value obtained by adding the original value of the pixel 705Gc to the amount of charge leaked from the pixel 705Ga. Hence, as represented by the following Expression (5), the original value of the pixel 705Ga is derived by adding the difference between the original value of the pixel 705Gc and the value of the pixel 705Gc to the value of pixel 705Ga.

(Pixel 705*Gc*−Original Pixel 705*Gc*)+Pixel 705*Ga*=Original Pixel 705*Ga*     (5)

In addition, the original values of the pixels 705Gb and 705Gd can be derived by the same procedure.

As described above, in the present embodiment, the first boundary (the boundary 601 of the first microlens) and the third boundary (the boundary 601 of the second microlens) are placed to extend in different directions from each other (in the vertical direction and the lateral direction). In other words, the second boundary (the boundary 602 of the first microlens) and the fourth boundary (the boundary 602 of the second microlens) are placed to extend in different directions from each other. In this configuration, the plurality of first pixels (pixels a to d in FIG. 4A) and the plurality of second pixels (pixels a to d in FIG. 4B) are configured to have the saturation characteristics different from each other. Thus, even when a saturated pixels exist, the original charge amount of the saturated pixel can be obtained using the nearby pixel.

Embodiment 2

Figure 7:
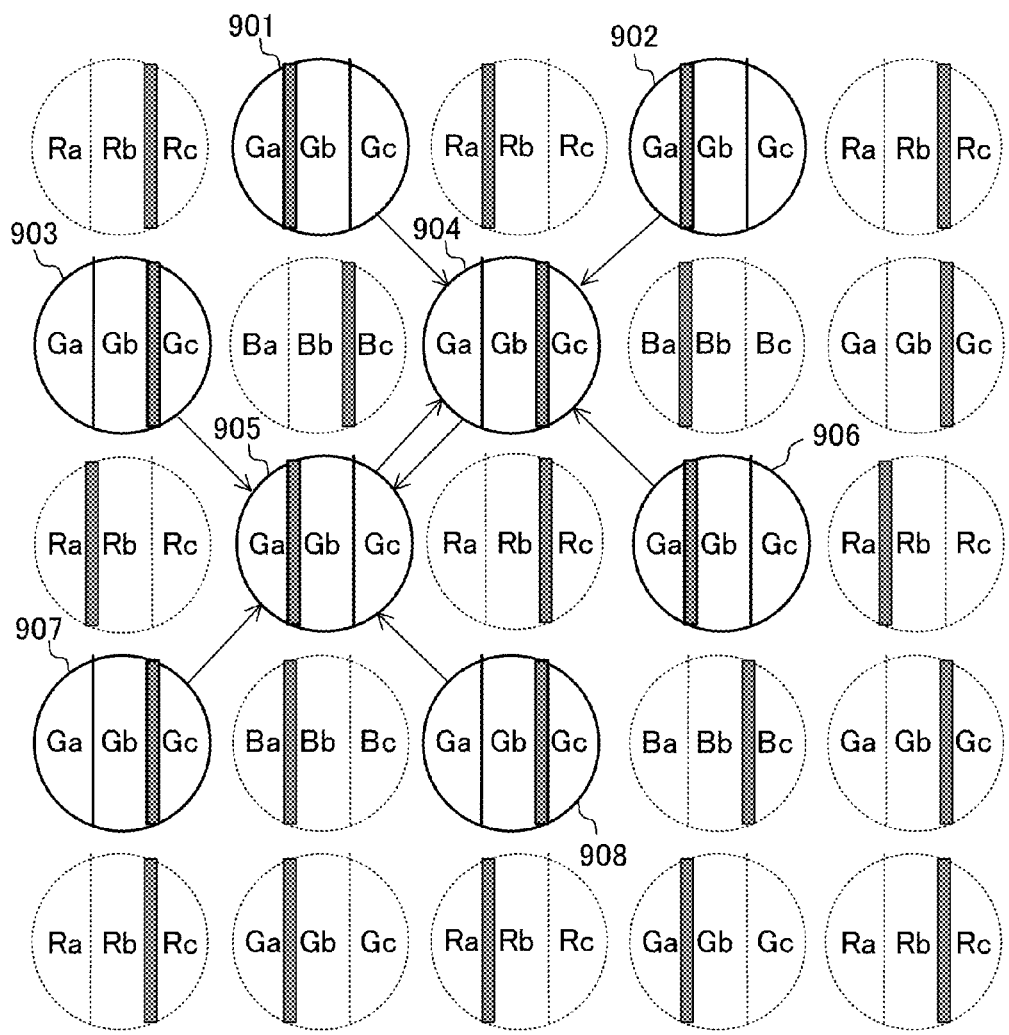
FIG. 7 is a diagram illustrating a pixel arrangement of the image pickup element in Embodiment 2.

Next, referring to FIGS. 4C, 4D, and 7, a method of performing the correction by the saturation correcting unit 105 in Embodiment 2 of the present invention will be described. The present embodiment describes a correction method when the number of divided pixels is three (a three-divided pixel configuration).

Figure 4D:
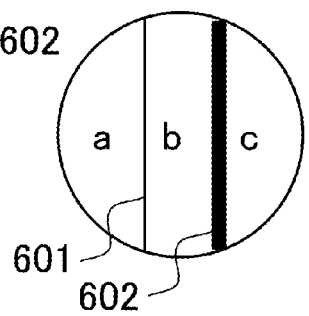

FIGS. 4C and 4D are diagrams illustrating variations of the pixels of the image pickup element 102 in the present embodiment. FIG. 7 is a diagram illustrating the pixel arrangement of the image pickup element 102. In the present embodiment, the pixels of the image pickup element 102 are configured in a Bayer array. Each of the pixels of R, G, and B is a pixel divided along a vertical direction evenly in three for one microlens 201 as illustrated in FIGS. 4C and 4D.

In FIGS. 4C and 4D, the boundary 602 dividing a pixel is a boundary through which a charge does not leak (a boundary through which a charge hardly leaks), and the boundary 601 is a boundary through which a charge leaks (a boundary through which a charge easily leaks). In FIG. 4C, when a pixel a (a third pixel) is saturated, the charge of the pixel a does not leak to the pixel b (a first pixel). When the pixel b is saturated, the charge of the pixel b leaks to the pixel c (a second pixel), but not to the pixel a. When the pixel c is saturated, the charge of the pixel c leaks to the pixel b. Similarly, in FIG. 4D, a charge leak can occur between the pixel a (a fifth pixel) and the pixel b (a fourth pixel), but a charge leak does not occur between the pixel b (the fourth pixel) and the pixel c (a sixth pixel). In the present embodiment, as illustrated in FIG. 7, the pixels having these characteristics (the pixel of FIG. 4C and the pixel of FIG. 4D) are placed such that as for adjacent pixels having the same color, the same pixels as in FIG. 4C alternate with the same pixels as in FIG. 4D.

<Case of Performing the Correction Using Added Pixel Values not Demonstrating Knee Characteristics in the Vicinity When One of the Three Divided Pixels is Saturated>

Subsequently, referring to FIG. 7, the method of correcting a pixel 904 (a G pixel) in the case where the right pixel of the three pupil-divided pixels is saturated will be described. When a pixel 904Gc is saturated, for pixels 904Gb and 904Ga, the original value is kept since the pixel 904 has the structure in which charge does not leak between the pixels 904Gb and 904Ga, so that they are non-destructive. Accordingly, the pixel 904Gc is to be subject to the correction.

When the pixel 901Gc is saturated, since a charge leaks from the pixel 901Gc to the pixel 901Gb, the value of the pixel 901Gb becomes a value obtained by adding the original value of pixel 901Gb to the amount of charge leaked from pixel 901Gc. On the other hand, since a charge does not leak to the pixel 901Ga, an original value of the pixel 901Ga is kept, and thus the pixel 901Ga is non-destructive.

The added pixel value obtained by adding the value of pixel 901Gb and the value of pixel 901Gc is reliable since its linearity is kept. Similarly, the added pixel values of the pixels Gb and Gc of pixels 902, 905, and 906 are also reliable.

In the present embodiment, since pixels having correct values (correct charge amounts) exist in the vicinity of the pixel subject to correction, the saturation correcting unit 105 can estimate the original charge amount (a correct value) of the pixel subject to correction by performing the defect pixel correction. Specifically, as represented by the following Expression (6), the original value of the pixel 904Gc is derived by subtracting the value of the pixel 904Gb from an average value of the added values of pixels Gb and Gc of the pixels having the same color in the vicinity.

((Pixel 901*Gb*+Pixel 901*Gc*)+(Pixel 902*Gb*+Pixel 902*Gc*)+(Pixel 905*Gb*+Pixel 905*Gc*)+(Pixel 906*Gb*+Pixel 906*Gc*))/4−Pixel 904*Gb*=Original Pixel 904*Gc*     (6)

<Case of Performing the Correction Using the Values of Non-Destructive Pixels in the Vicinity When One of the Three Divided Pixels is Saturated>

Subsequently, referring to FIG. 7, a method of correcting a pixel 905 (a G pixel) in the case where the right pixel of the three pupil-divided pixels is saturated will be described. When a pixel 905Gc is saturated, since the pixel 905 has the structure in which a charge leaks from the pixel 905Gc to the pixel 905Gb, the value of the pixel 905Gb becomes a value obtained by adding the original value of the pixel 905Gb to the amount of charge leaked from the pixel 905Gc. On the other hand, the original value of the pixel 905Ga is kept since the charge does not leak to the pixel 905Ga, and thus the pixel 905Ga is non-destructive. Accordingly, pixels 905Gb and 905Gc are subject to correction.

When the pixel 903Gc is saturated, each of the original values of the pixels 903Gb and 903Ga is kept since the pixel 903 has the structure in which a charge does not leak to the pixel 903Gb nor 903Ga, and thus the pixels 903Gb and 903Ga are non-destructive. Similarly, the pixels Ga and Gb of pixels 904, 907, and 908 are also non-destructive.

In the present embodiment, because pixels having correct values (correct charge amounts) exist in the vicinity of the pixel subject to the correction, the saturation correcting unit 105 can estimate the original charge amount (the correct value) of the pixel subject to the correction by performing the defect pixel correction. Specifically, as represented by the following Expression (7), the original value of the pixel 905Gb is derived from an average value of the pixels Gb in its vicinity.

(Pixel 903$Gb$+Pixel 904$Gb$+Pixel 907$Gb$+Pixel 908$Gb$)/4=Original Pixel 905$Gb$ (7)

The value (an actual value) of the pixel 905Gb is a value obtained by adding the original value of the pixel 905Gb to the amount of charge leaked from the saturated pixel 905Gc. Hence, as represented by the following Expression (8), the original value of the pixel 905Gc is derived by adding the difference between the original value of the pixel 905Gb and the value of the pixel 905Gb to the value of pixel 905Gc.

(Pixel 905$Gb$−Original Pixel 905$Gb$)+Pixel 905$Gc$=Original Pixel 905$Gc$ (8)

As described above, in the present embodiment, the first boundary (the boundary 601 of the first microlens) and the third boundary (the boundary 601 of the second microlens) are placed at different positions from each other (different positions relative to the corresponding microlens). In other words, the second boundary (the boundary 602 of the first microlens) and the fourth boundary (the boundary 602 of the second microlens) are placed at different positions from each other. In this configuration, the plurality of first pixels (pixels a to c in FIG. 4C) and the plurality of second pixels (pixels a to c in FIG. 4D) are configured to be different in the saturation characteristics. Thus, even when a saturated pixel exists, the original charge amount of the saturated pixel can be obtained using a nearby pixel.

Embodiment 3

Figure 8:
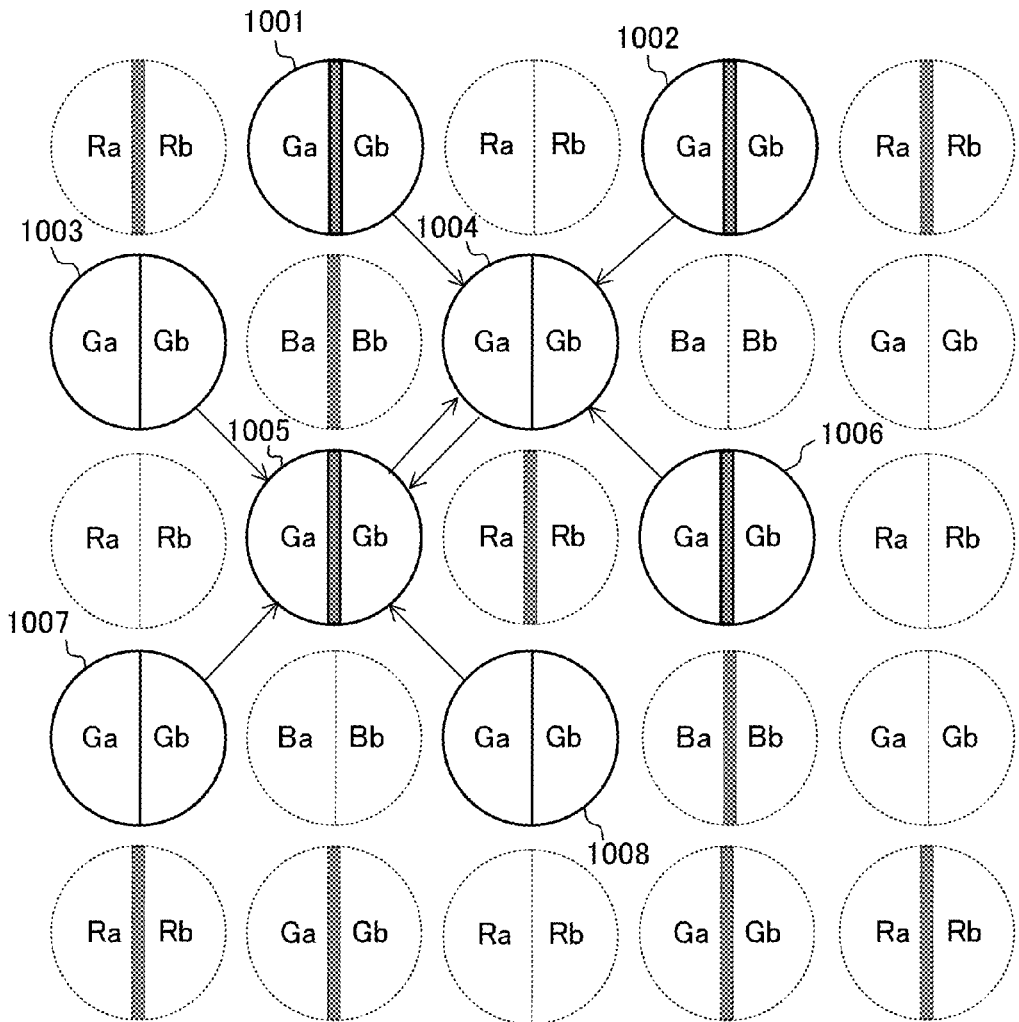
FIG. 8 is a diagram illustrating a pixel arrangement of the image pickup element in Embodiment 3.

Next, referring to FIGS. 4E, 4F, and 8, a method of correction by the saturation correcting unit 105 in Embodiment 3 of the present invention will be described. The present embodiment is a correction method when the number of divided pixels is two (a two-divided pixel configuration).

Figure 4F:
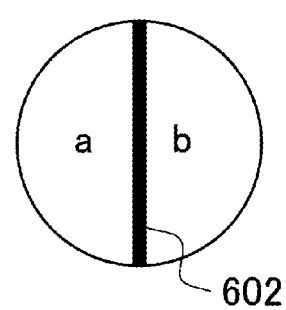

FIGS. 4E and 4F are diagrams illustrating variations of the pixels of the image pickup element 102 in the present embodiment. FIG. 8 is a diagram illustrating the pixel arrangement of the image pickup element 102. In the present embodiment, the pixels of the image pickup element 102 are configured in a Bayer array. Each of pixels of R, G, and B is a pixel divided evenly into two pixels for one microlens 201 along a vertical direction as illustrated in FIGS. 4E and 4F.

In FIGS. 4E and 4F, the boundary 602 dividing a pixel is a boundary through which a charge does not leak (a boundary through which a charge hardly leaks), and the boundary 601 is a boundary through which a charge leaks (a boundary through which a charge easily leak). Thus, in FIG. 4E, for example, when the pixel a (a first pixel) is saturated, the charge of the pixel a leaks to the pixel b (a second pixel). When the pixel b is saturated, the charge of the pixel b leaks to the pixel a. On the other hand, in FIG. 4F, when the pixel a (a third pixel) is saturated, the charge of the pixel a does not leak to the pixel b (a fourth pixel). When the pixel b is saturated, the charge of the pixel b does not leak to the pixel a. In the present embodiment, as illustrated in FIG. 8, the pixels having the characteristics (the pixel of FIG. 4E and the pixel of FIG. 4F) are placed such that as for adjacent pixels having the same color, the same pixels as in FIG. 4E alternate with the same pixels as in FIG. 4F.

<Case of Performing the Correction Using the Values of non-Destructive Pixels in the Vicinity When One of the Two Divided Pixels is Saturated>

Subsequently, referring to FIG. 8, a method of correcting a pixel 1004 (a G pixel) in the case where the right pixel of two pupil-divided pixels is saturated will be described. When a pixel 1004Gb is saturated, since the pixel 1004 has the structure in which a charge leaks from the pixel 1004Gb to the pixel 1004Ga, the value of the pixel 1004Ga becomes a value obtained by adding the original value of pixel 1004Ga to the amount of charge leaked from pixel 1004Gb. Accordingly, the pixels 1004Ga and 1004Gb are subject to correction.

When the pixel 1001Gb is saturated, the original value of the pixels 1001Ga is kept since the pixel 1001 has the structure in which a charge does not leak from the pixel 1001Gb to the pixel 1001Ga, and thus the pixel 1001Ga is non-destructive. Similarly, pixels 1002, 1005, and 1006 are also non-destructive.

In the present embodiment, since pixels having correct values (correct charge amounts) exist in the vicinity of the pixel subject to the correction, the saturation correcting unit 105 can estimate the original charge amounts (correct values) of the pixels subject to the correction by performing the defect pixel correction. Specifically, as represented by the following Expression (9), the original value of the pixel 1004Gb is derived from an average value of the pixels Gb in its vicinity.

(Pixel 1001$Gb$+Pixel 1002$Gb$+Pixel 1005$Gb$+Pixel 1006$Gb$)/4=Original Pixel 1004$Gb$ (9)

<Case of Performing the Correction Using Added Pixel Values not Demonstrating Knee Characteristics in the Vicinity When One of the Two Divided Pixels is Saturated>

Subsequently, referring to FIG. 8, a method of correcting a pixel 1005 (a G pixel) in the case where the right pixel of two pupil-divided pixels is saturated will be described. When a pixel 1005Gb is saturated, the original value of a pixel 1005Ga is kept since the pixel 1005 has the structure in which a charge does not leak to the pixel 1005Ga, and thus the pixel 1005Ga is non-destructive. Accordingly, the pixel 1005Gb is subject to correction.

When the pixel 1003Gb is saturated, since the pixel 1003 has the structure in which a charge leaks from the pixel 1003Gb to the pixel 1003Ga, the value of the pixel 1003Ga becomes a value obtained by adding the original value of pixel 1003Ga to the amount of charge leaked from the pixel 1003Gb. The value (added pixel value) obtained by adding the values of the pixel 1003Ga and pixel 1003Gb is reliable since its linearity is kept. Similarly, the added pixel values of pixels 1004, 1007, and 1008 are also reliable.

In the present embodiment, since the pixels having correct values (correct charge amounts) exist in the vicinity of the pixel subject to correction, the saturation correcting unit 105 can estimate the original charge amount (a correct value) of the pixel subject to correction by performing the defect pixel correction. Specifically, as represented by the following Expression (10), the original value of the pixel 1005Gb is derived by subtracting the value of the pixel 1005Ga from an average value of the added pixel values having the same color in its vicinity.

((Pixel 1003$Ga$+Pixel 1003$Gb$)+(Pixel 1004$Ga$+Pixel 1004$Gb$)+(Pixel 1007$Ga$+Pixel 1007$Gb$)+(Pixel 1008$Ga$+Pixel 1008$Gb$))/4−Pixel 1005$Ga$=Original Pixel 1005$Gb$     (10)

As described above, according to the present embodiment, the first microlenses and the second microlenses are alternately arranged in two dimensions, and thus the saturation characteristics of the plurality of first pixels and the plurality of second pixels are different from each other. As a result, the plurality of first pixels (pixels a, b in FIG. 4E) and the plurality of second pixels (pixels a, b in FIG. 4F) are configured so that the saturation characteristics are different from each other. Therefore, even when a saturated pixel exists, the original charge amount of the saturated pixel can be obtained using the nearby pixel.

According to the configuration of each of the embodiments described above, since a plurality of pixels (peripheral pixels) which are different in the way that a charge leaks are arranged, the original value (the original charge amount) can be estimated using the values of non-destructive pixels having the same color in its vicinity. Considering added pixels, by arranging alternately added pixels demonstrating knee characteristics and added pixels for which linearity is kept, these pixels can be complementary. In each of the embodiments, the correction is performed by using the average value of the pixels having the same color in the vicinity, but the embodiment is not limited to this, and for example the correction may be performed using an algorithm of the defect pixel correction. Further, in each of the embodiments, the correction is performed using pixels having the same color in the vicinity, but the embodiment is not limited to this. For example, by obtaining the proportion of each color in the vicinity to previously correct the difference in sensitivity between colors, the correction can also be performed based on the pixels on the left, right, top, and bottom in the vicinity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-007281, filed on Jan. 18, 2013, which is hereby incorporated by reference herein in its entirety.

What is claimed is:

1. A signal processing apparatus which processes signals obtained from an image pickup element including a first plurality of pixels sharing a first microlens and a second plurality of pixels sharing a second microlens, the first plurality of pixels and the second plurality of pixels having saturation characteristics different from each other, the signal processing apparatus comprising:
   a saturation detector configured to detect a saturated pixel whose charge amount has reached a saturation level among the first plurality of pixels and the second plurality of pixels; and
   an estimating portion configured to estimate the charge amount of the saturated pixel using a nearby pixel of the saturated pixel.

2. The signal processing apparatus according to claim 1, wherein the estimating portion estimates the charge amount of the saturated pixel using a charge amount of the nearby pixel, having different saturation characteristics, located in a vicinity of the saturated pixel.

3. The signal processing apparatus according to claim 1, wherein the estimating portion estimates the charge amount of the saturated pixel using an added pixel value whose linearity is kept of the nearby pixels located in a vicinity of the saturated pixel.

4. The image pickup apparatus according to claim 1, wherein the estimating portion estimates a charge amount of a first pixel, sharing a first microlens, which is saturated with the following steps:
   calculating a charge amount of another first pixel, which is not saturated, sharing the first microlens using a charge amount of second pixels, sharing a second microlens different from the first microlens and being around the another first pixel, wherein a charge is movable from the first pixel to the another first pixel in a case where the charge amount of the first pixel is saturated,
   comparing the calculated charge amount of the another first pixel and the obtained charge amount of the another first pixel by the image pickup element,
   estimating the charge amount of the first pixel using the comparison result.

5. The image pickup apparatus according to claim 1, wherein the estimating portion estimates a charge amount of a first pixel, sharing a first microlens, which is saturated by calculating a charge amount which is moved from the first pixel to another first pixel, which is not saturated, sharing the first microlens using a charge amount of second pixels, sharing a second microlens different from the first microlens and being around the another first pixel, wherein a charge is movable from the first pixel to the another first pixel in a case where the charge amount of the first pixel is saturated.

6. An image pickup apparatus comprising:
   an image pickup element including a first plurality of pixels sharing a first microlens and a second plurality of pixels sharing a second microlens, the first plurality of pixels and the second plurality of pixels having saturation characteristics different from each other;
   a saturation detector configured to detect a saturated pixel whose charge amount has reached a saturation level among the first plurality of pixels and the second plurality of pixels; and
   an estimating portion configured to estimate the charge amount of the saturated pixel using a nearby pixel of the saturated pixel.

7. The image pickup apparatus according to claim 6, wherein the first plurality of pixels includes:
   a first pixel, a second pixel, and a third pixel;
   a first boundary provided between the first pixel and the second pixel; and
   a second boundary provided between the first pixel and the third pixel,
   wherein when the charge amount of the first pixel is saturated, a first charge amount that moves from the first pixel to the second pixel via the first boundary is greater than a second charge amount that moves from the first pixel to the third pixel via the second boundary,
   wherein the second plurality of pixels includes:
   a fourth pixel, a fifth pixel, and a sixth pixel;
   a third boundary provided between the fourth pixel and the fifth pixel, and
   a fourth boundary provided between the fourth pixel and the sixth pixel, and
   wherein when the charge amount of the fourth pixel is saturated, a third charge amount that moves from the fourth pixel to the fifth pixel via the third boundary is greater than a fourth charge amount that moves from the fourth pixel to the sixth pixel via the fourth boundary.

8. The image pickup apparatus according to claim 7,
wherein when the charge amount of the first pixel is saturated, the first boundary is configured so that a charge is movable from the first pixel to the second pixel, and the second boundary is configured so that the charge is prevented from moving from the first pixel to the third pixel, and wherein when the charge amount of the fourth pixel is saturated, the third boundary is configured so that a charge is movable from the fourth pixel to the fifth pixel, and the fourth boundary is configured so that the charge is prevented from moving from the fourth pixel to the sixth pixel.

9. The image pickup apparatus according to claim 7, wherein the first boundary and the third boundary are provided in directions different from each other so that the saturation characteristics of the first plurality of pixels and the second plurality of pixels are different from each other.

10. The image pickup apparatus according to claim 6,
wherein the first plurality of pixels includes a first pixel, a second pixel, and a first boundary provided between the first pixel and the second pixel,
wherein the second plurality of pixels includes a third pixel, a fourth pixel, and a second boundary provided between the third pixel and the fourth pixel, and
wherein when the charge amounts of the first pixel and the third pixel are saturated, a first charge amount that moves from the first pixel to the second pixel via the first boundary is greater than a second charge amount that moves from the third pixel to the fourth pixel via the second boundary.

11. The image pickup apparatus according to claim 10, wherein when the charge amounts of the first pixel and the third pixel are saturated, the first boundary is configured so that a charge is movable from the first pixel to the second pixel, and the second boundary is configured so that a charge is prevented from moving from the third pixel to the fourth pixel.

12. The image pickup apparatus according to claim 10, wherein the first microlenses and the second microlenses are alternately arrayed in two dimensions so that the saturation characteristics of the first plurality of pixels and the second plurality of pixels are different from each other.

13. The image pickup apparatus according to claim 6,
wherein each of the first boundary and the second boundary is configured by a P-type semiconductor, and
wherein a P-type impurity concentration of the first boundary is lower than a P-type impurity concentration of the second boundary.

14. An image pickup system comprising:
an image pickup optical system;
an image pickup element including a first plurality of pixels sharing a first microlens and a second plurality of pixels sharing a second microlens, the first plurality of pixels and the second plurality of pixels having saturation characteristics different from each other;
a saturation detector configured to detect a saturated pixel whose charge amount has reached a saturation level among the first plurality of pixels and the second plurality of pixels; and
an estimating portion configured to estimate the charge amount of the saturated pixel using a nearby pixel of the saturated pixel.

15. An image pickup apparatus comprising:
an image pickup element including a first plurality of pixels sharing a first microlens and a second plurality of pixels sharing a second microlens, the first plurality of pixels and the second plurality of pixels having saturation characteristics different from each other,
wherein the first plurality of pixels includes: a first pixel in a first position, a second pixel in a second portion, a third pixel in a third position, a first boundary provided between the first pixel and the second pixel, and a second boundary provided between the first pixel and the third pixel,
wherein, when the charge amount of the first pixel is saturated, a first charge amount that moves from the first pixel to the second pixel via the first boundary is greater than a second charge amount that moves from the first pixel to the third pixel via the second boundary,
wherein the second plurality of pixels includes: a fourth pixel in the first position, a fifth pixel in the second position, a sixth pixel in the third position, a third boundary provided between the fourth pixel and the fifth pixel, and a fourth boundary provided between the fourth pixel and the sixth pixel, and
wherein, when the charge amount of the fourth pixel is saturated, a third charge amount that moves from the fourth pixel to the fifth pixel via the third boundary is greater than a fourth charge amount that moves from the fourth pixel to the sixth pixel via the fourth boundary;
a saturation detector configured to detect a saturated pixel in a first pixel of first data whose charge amount has reached a saturation level among the first plurality of pixels and the second plurality of pixels; and
an estimating portion configured to estimate the charge amount of the saturated pixel in a first position by estimating the second pixel among the first plurality of pixels using the second pixel and the forth pixel in the second position.

16. An image pickup apparatus comprising:
an image pickup element including a first plurality of pixels sharing a first microlens and a second plurality of pixels sharing a second microlens, the first plurality of pixels and the second plurality of pixels having saturation characteristics different from each other,
wherein the first plurality of pixels includes: a first pixel in a first position, a second pixel in a second portion, a third pixel in a third position, a fourth pixel on a forth position, a first boundary provided between the first pixel and the second pixel and between the third pixel and the fourth pixel, and a second boundary provided between the first pixel and the third pixel and between the second pixel and the fourth pixel,
wherein, when the charge amount of the first pixel is saturated, a first charge amount that moves from the first pixel to the second pixel via the first boundary is greater than a second charge amount that moves from the first pixel to the third pixel via the second boundary,
wherein the second plurality of pixels includes: a fifth pixel in the first position, a sixth pixel in the second position, a seventh pixel in the third position, an eighth pixel in the fourth position, a third boundary provided between the fifth pixel and the seventh pixel and the sixth pixel and the eighth pixel, and a fourth boundary provided between the fifth pixel and the sixth pixel and between the seventh pixel and the eighth pixel, and
wherein, when the charge amount of the fifth pixel is saturated, a third charge amount that moves from the fifth pixel to the sixth pixel via the third boundary is greater than a fourth charge amount that moves from the fifth pixel to the seventh pixel via the fourth boundary;

a saturation detector configured to detect a saturated pixel in a first pixel of first data whose charge amount has reached a saturation level among the first plurality of pixels and the second plurality of pixels; and an estimating portion configured to estimate the charge amount of the saturated pixel in a first position by estimating the second pixel among the first plurality of pixels using the second pixel and the forth pixel in the second position.

17. The image pickup apparatus according to claim 16, wherein, when the charge amount of the first pixel is saturated, the first boundary is configured so that a charge is movable from the first pixel to the second pixel, and the second boundary is configured so that the charge is prevented from moving from the first pixel to the third pixel, and wherein, when the charge amount of the fifth pixel is saturated, the third boundary is configured so that a charge is movable from the fifth pixel to the sixth pixel, and the fourth boundary is configured so that the charge is prevented from moving from the seventh pixel to the sixth pixel.

18. The image pickup apparatus according to claim 16, wherein the first boundary and the third boundary are provided in directions different from each other so that the saturation characteristics of the first plurality of pixels and the second plurality of pixels are different from each other.

\* \* \* \* \*